United States Patent Office 3,269,251
Patented August 30, 1966

3,269,251
THREADED INSERTS WITH SLIDING SEGMENTAL SECURING MEANS
Henry James Bass, 360 La Perle Place, Costa Mesa, Calif.
Filed Aug. 17, 1964, Ser. No. 390,137
1 Claim. (Cl. 85—66)

This invention relates to internally threaded inserts which are adapted to be driven into unthreaded mounting holes in the work piece to grip the walls of said holes and function as nuts.

It is an object of this invention to provide threaded inserts having teeth which are adapted to be imbedded into the walls of their mounting holes in the work piece and provide high torque-out and pull-out resistance thereof.

Another object of this invention is to provide threaded inserts of the character just described having self-retaining means.

The present invention is illustrated as being used in "blind" applications, however, the invention may also be used in "non-blind" applications.

Other objects and features of this invention will be readily apparent to those skilled in the art from the following specification and related drawings.

The following drawings illustrate the preferred invention embodied herein. Like numerals refer to corresponding similar parts throughout the various illustrations.

Figure 1:
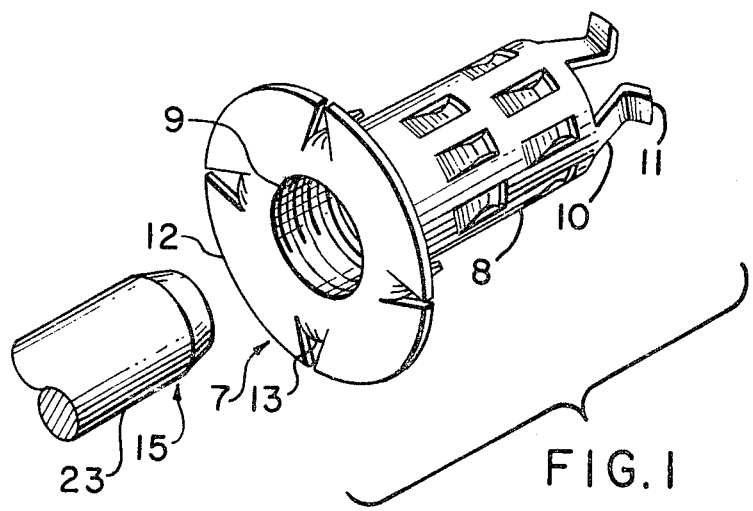
FIGURE 1 is a perspective view of the protruding head insert of this invention.

Looking at FIGURE 1, the protruding head insert 7 has a cylindrically hollow sleeve 8 which is internally threaded at 9. At intervals on said sleeve 8 and at one end thereof are provided "L" shaped teeth 10 having sharp-edged tips 11 (although pointed tips or the like may be provided) which are adapted to be imbedded into the wall of the mounting hole in the work piece by shaft 15. Said tips 11 do not protrude beyond the outside diameter of said sleeve 8 to allow free entry of insert 7 into said mounting hole. Said shaft 15 has an outside diameter 23 slightly smaller than the minor diameter of said internal thread 9 to allow free passage therein. The other end of said sleeve 8 has an annular flat head 12 with retaining pointed prongs 13 normal to the axis thereof. Said insert 7 may be fabricated from one piece of sheet material or tubing material without departing from the basic design and principle embodied in this invention.

Figure 2:
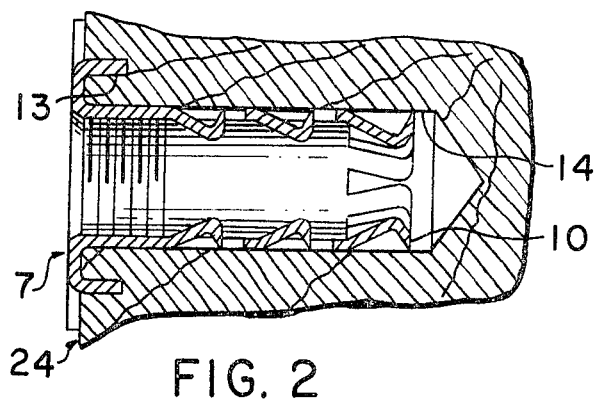
FIGURE 2 is an axial cross-section of the insert in FIGURE 1 in the preinstalled position.

Looking at FIGURE 2, the protruding head insert 7 is shown preinstalled with the pointed retaining prongs 13 thereof pressed in by hand into the work piece 24 securing same in mounting hole 14 in said work piece 24 prior to expanding the teeth 10 thereof.

Figure 3:
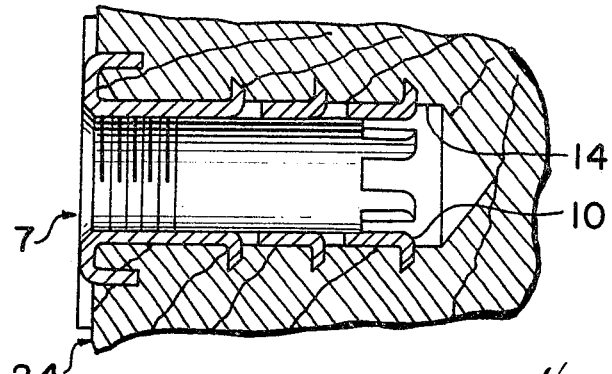
FIGURE 3 is an axial cross-section of the insert of FIGURE 1 in the installed position.

FIGURE 3 shows the protruding head insert 7 installed to function as a nut after the "L" shaped prongs 10 thereof are forced radially outward and imbedded into mounting hole wall 14 in the work piece 24 by driving the shaft 15 into sleeve 8 of insert 7. Said prongs 10 may also be forced radially outward by the mating member which is threaded into said insert 7 to imbed said prongs 10 into said mounting hole 14 thereby eliminating the need for said shaft 15.

Figure 4:
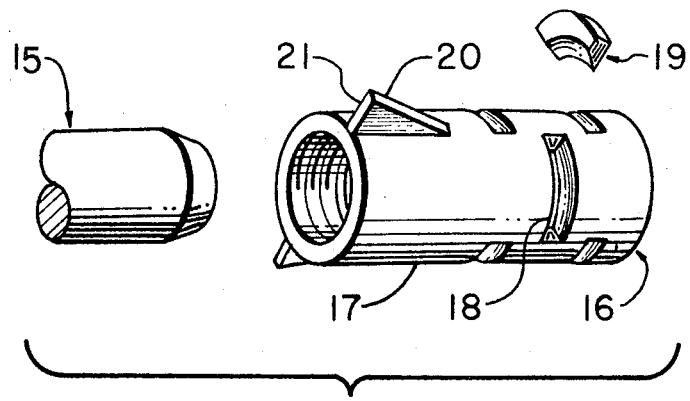
FIGURE 4 is an exploded perspective view of the flush head insert of this invention.

Looking at FIGURE 4, the flush head insert 16 has a cylindrically hollow sleeve 17 with internal threads at least at one end thereof. At intervals on said sleeve are provided a plurality of slots 18 inwardly of said one end and extending circumferentially. Segmental teeth 19 are mounted for sliding movement in said slots and projected into the bore of said sleeve. The segmental teeth 19 are arcuate and have radially inner and outer surfaces inclined and in a converging relation toward the end of said sleeve opposite said one end. Said slots 18 are shown rectangular, however, said slots 18 may be square, triangular or the like in configuration with the corresponding segmental teeth housed therein without departing from the basic design and principle embodied in this invention. Said teeth 19 may be temporarily held in said slots 18 by a thin coating of plastic or by the friction of slightly oversized segmental teeth 19. Said teeth 19 are adapted to be forced radially outward through said slots 18 and imbedded into the mounting hole wall in the work piece by driving shaft 15 into the sleeve 17. Said sleeve 17 is provided with a plurality of retaining means 20 integral with and projecting radially outwardly from said sleeve with one of its sides 21 being flush with said one end of said sleeve.

Figure 5:
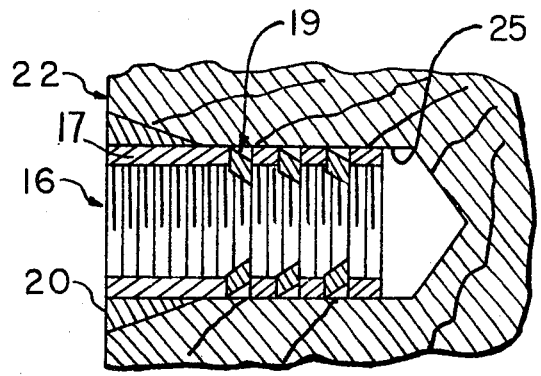
FIGURE 5 is an axial cross-section of the insert of FIGURE 4 in the preinstalled position.

FIGURE 5 shows the flush head insert 16 preinstalled with the retaining fins 20 thereof flush with the work piece 22 and securing same in the mounting hole 25 in said work piece 22 prior to imbedding the segmental teeth 19 thereof into the wall of said mounting hole 25.

Figure 6:
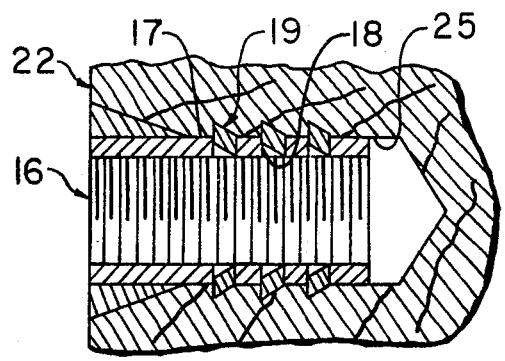
FIGURE 6 is an axial cross-section of the insert of FIGURE 4 in the installed position.

FIGURE 6 illustrates the flush head insert 16 installed with the segmental teeth 19 thereof imbedded into the mounting hole wall 25 in work piece 22 by driving shaft 15 into sleeve 17 of insert 16. Said segmental teeth 19 may also be forced radially outward through said slots 18 by the mating member which is threaded into said insert 16 to imbed said teeth 19 into said mounting hole 25 thereby eliminating the need for said shaft 15.

I claim:
A self-retaining insert which is adapted to be imbedded into an unthreaded mounting hole in the work piece to function as a nut comprising, in combination, a cylindrically hollow sleeve, said sleeve having a plurality of retaining means integral with and projecting radially outwardly from said sleeve, said retaining means being flush with one end of said sleeve and being adapted for pressing into said mounting hole for retention therein with said one end flush with the surface of said work piece, said sleeve having internal threads at least at said one end, at intervals on said sleeve being provided a plurality of slots inwardly of said one end and extending circumferentially, segmental teeth mounted for sliding movement in said slots and projected into the bore of said sleeve, said segmental teeth being arcuate and having radially inner and outer surfaces inclined and in a converging relation toward the end of said sleeve opposite said one end, said segmental teeth being adapted to be forced radially outwardly through said slots and imbedded into the walls of said mounting hole permanently securing said insert therein.

References Cited by the Examiner
UNITED STATES PATENTS

| 843,271 | 2/1907 | Hanlon | 85—66 |
|---|---|---|---|
| 1,021,794 | 4/1912 | Pleister | 85—66 |
| 1,470,858 | 10/1923 | Maxwell | 85—83 |
| 1,754,333 | 4/1930 | Pleister et al. | 85—84 |
| 2,596,952 | 5/1952 | Crowther | 85—85 |
| 3,019,887 | 2/1962 | Lowden | 151—41.73 |
| 3,093,178 | 6/1963 | Boyd | 151—41.73 |

FOREIGN PATENTS

| 1,134,769 | 12/1956 | France. |
|---|---|---|
| 25,944 | 11/1906 | Great Britain. |
| 249,079 | 3/1948 | Switzerland. |

EDWARD C. ALLEN, *Primary Examiner.*